United States Patent [19]

Sakurai et al.

[11] Patent Number: 4,652,953
[45] Date of Patent: Mar. 24, 1987

[54] MAGNETIC HEAD ACTUATING MECHANISM CONSTRUCTED TO MINIMIZE ADDRESS EFFECT OF DISTURBANCE THERETO

[75] Inventors: Kanji Sakurai; Hideo Tsumura; Chiaki Kawamura, all of Kanagawa, Japan

[73] Assignee: Mitsubishi Denki Kabushiki Kaisha, Tokyo, Japan

[21] Appl. No.: 717,137

[22] Filed: Mar. 28, 1985

[30] Foreign Application Priority Data

Mar. 29, 1984 [JP] Japan ................................. 59-61602

[51] Int. Cl.⁴ ...................... G11B 21/08; G11B 21/16
[52] U.S. Cl. .................................................. 360/106
[58] Field of Search ......................................... 360/106

[56] References Cited

U.S. PATENT DOCUMENTS 3,500,363  7/1966  Shill ................................... 360/106
4,164,766  8/1979  Kaseta et al. ...................... 360/106
4,164,769  8/1979  Kaseta et al. ...................... 360/106

FOREIGN PATENT DOCUMENTS 0049946  4/1982  European Pat. Off. ............ 360/106
59-58669  4/1984  Japan .
1145536  3/1969  United Kingdom .

Primary Examiner—Robert S. Tupper
Attorney, Agent, or Firm—Bernard, Rothwell & Brown

[57] ABSTRACT

A magnetic head actuating mechanism including a capstan attached to the shaft of a magnetic head driving motor, and an actuator arm supported on a pivot, adapted to be turned through a thin metallic band by the capstan and mounted fixedly at one end thereof with at least one magnetic head. The magnetic head actuating mechanism is designed so that the moment of the unbalanced mass of the turning assembly thereof about the pivot is within the predetermined range. The magnetic head is held stationary even while the magnetic head driving motor is not energized. Thus, the magnetic head actuating mechanism obviates the injurious state of contact between the magnetic head and a magnetic disk easily and need not have any magnetic head locking mechanism.

2 Claims, 2 Drawing Figures

MAGNETIC HEAD ACTUATING MECHANISM CONSTRUCTED TO MINIMIZE ADDRESS EFFECT OF DISTURBANCE THERETO

BACKGROUND OF THE INVENTION

1. Field of the Invention

The present invention relates to a magnetic head actuating mechanism for a magnetic disk apparatus or the like, and more particularly to a magnetic head actuating mechanism for actuating a rotary magnetic head which moves along a circular arc on a pivot.

2. Description of the Prior Art

A mechanism of this type such as shown in FIG. 1 has heretofore been proposed. In FIG. 1, there are shown a magnetic disk 1, a magnetic head 2 which is floated slightly over the magnetic disk 1 as the magnetic disk rotates, to write data in or to read data from the magnetic disk 1, an actuator arm 3 mounted with the magnetic head 2 and adapted to turn on a bearing 4, and a capstan 5 mounted on the shaft of a driving motor. When the shaft of the driving motor rotates, the capstan 5 winds or unwinds a thin metallic band 6. One end of the band 6 is fixed to a leaf spring 7 for preloading the band 6 and the other end of the band 6 is fixed to the actuator arm 3.

The action of this magnetic head actuating mechanism will be described hereinafter. Upon the actuation of the magnetic disk 1 for rotation, the magnetic head 2 is floated up by a distance of approximately 0.5 μm for reading or writing data. After the magnetic head 2 has been floated up, the capstan 5 is rotated to move the magnetic head 2 to bring the magnetic head 2 into alignment with each one of the data tracks formed in concentric circles on the magnetic disk 1. The magnetic head 2 moves along a circular arc on the bearing 4 of the actuator arm 3.

The movement of the magnetic head 2 in the direction of the data track as indicated by arrows A and B with the magnetic head 2 in contact with the magnetic disk 1 will possibly destroy the data stored in the magnetic disk 1. Therefore, the magnetic head 2 should never be moved while it is in contact with the magnetic disk 1.

This is also true when power is not supplied to the magnetic disk apparatus, and hence the magnetic disk apparatus needs to be equipped with some protective mechanism which is capable of checking the movement of the magnetic head 2 even if a disturbance within a range certified for the apparatus is applied to the apparatus. Usually, in the case of an apparatus of this kind, the maximum disturbance is such a shock as applied to the apparatus when the packed apparatus is dropped from a predetermined height, and the maximum disturbance is as large as around 30 G. According to a usual protective mechanism for restraining the movement of the magnetic head 2 during transportation, which have most commonly been employed, the magnetic head 2 is placed at a shipping position outside the data area during transportation and, in many cases, the magnetic head 2 is held at the shipping position by means of a locking mechanism.

Since the conventional magnetic disk apparatus is constituted as described hereinbefore, some protective mechanism has been necessary to restrain the magnetic head from moving during transportation. Therefore, it has been necessary to provide the magnetic disk apparatus with an additional mechanism, such as a shipping clamp mechanism or the like, which has imposed restrictions upon the manufacturer in designing the magnetic disk apparatus and entailed disadvantages such as increase in cost. Furthermore, the addition of such a mechanism, which is unnecessary to the users, deteriorated the reliability of the apparatus and the users were bothered by the troublesome operation of the shipping clamp mechanism.

SUMMARY OF THE INVENTION

Accordingly, it is an object of the present invention to provide a useful magnetic head actuating mechanism eliminated of the above-mentioned disadvantages of the conventional magnetic head actuating mechanism.

It is another object of the present invention to provide a magnetic head actuating mechanism of a simple construction and a reduced cost which need not be provided with any shipping clamp mechanism.

It is a further object of the present invention to provide a magnetic head actuating mechanism of high accuracy and optimum constitution capable of retaining the magnetic head at a correct position regardless of the manner of placement of the magnetic disk apparatus.

Other objects, features and advantages of the present invention will become apparent from the detailed description of a preferred embodiment thereof taken in conjunction with the accompanied drawings.

DESCRIPTION OF THE PREFERRED EMBODIMENT

Figure 1:
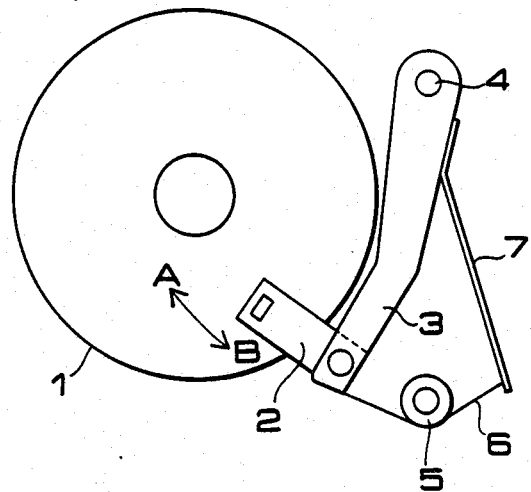
FIG. 1 is a plan view showing a conventional magnetic head actuating mechanism as applied to a magnetic disk apparatus.
Figure 2:
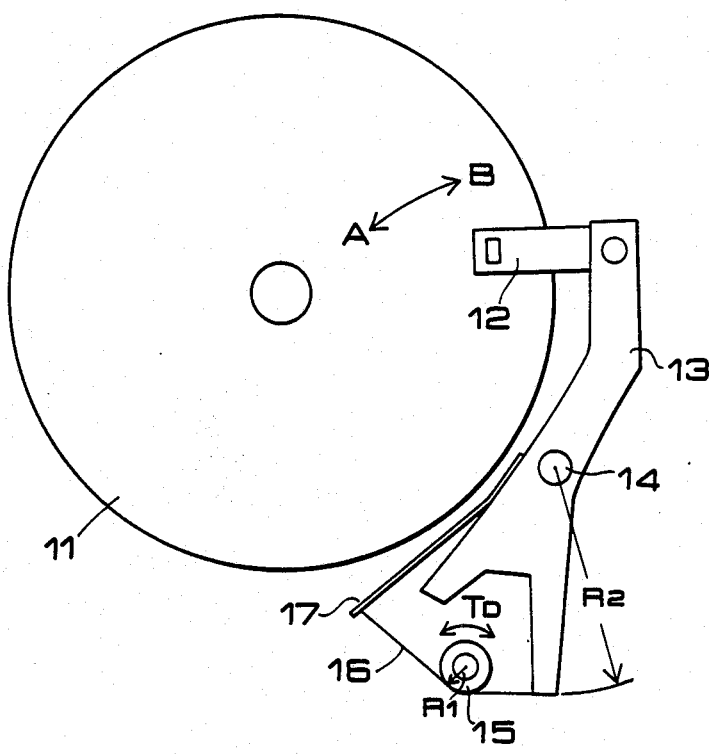
FIG. 2 is a plan view showing a magnetic head actuating mechanism, in a preferred embodiment, according to the present invention, as applied to a magnetic disk apparatus.

A preferred embodiment of the present invention will be described in connection with the drawings. In FIG. 2, there are shown a magnetic disk 11, a magnetic head 12, an actuator arm 13, a pivot 14 on which the actuator arm 13 turns, a capstan 15 attached to the shaft of a driving motor, and a thin metallic band 16. The practically lengthwise middle part of the metallic band 16 is driven by the circumference of the capstan 15, one end thereof is fixed to the actuator arm 13 and the other end thereof is fixed to a leaf spring 17 for preloading the band 16. In FIG. 2, a reference character $T_D$ designates the dead torque of the driving motor while the same is not energized, $R_1$ designates the radius of the capstan 15, and $R_2$ designates the distance between the center of the pivot 14 and a part where the band 16 is fixed to the actuator arm 13.

The actuator arm assembly, including the magnetic head 12 and the leaf spring 17, of the magnetic head actuating mechanism of the present invention is constructed so that the moment of the unbalanced mass of the actuator assembly about the pivot 14 is smaller than a predetermined value. That is, the actuator assembly is constructed so that the moment of the unbalanced mass thereof about the pivot 14 upon the application of the maximum disturbance within the range certified for the apparatus to the apparatus while the driving motor is not energized is capable of being countervailed by the dead torque $T_D$ of the driving motor.

More concretely, the ordinary maximum disturbance is, at the most, 30G that works on the apparatus when the same is dropped as packed. The maximum moment of the unbalanced mass M of the actuator assembly about the pivot 14 capable of being counterbalanced by the dead torque $T_D$ of the driving motor to retain the actuator arm 13 stationary is expressed by:

$$M \leq 1/K \times R_2/R_1 \times T_D$$

where $T_D$ is the dead torque of the driving motor, $R_1$ is the radius of the capstan, $R_2$ is the distance between the center of the pivot 14 of the actuator arm 13 to a part where the band 16 is fixed to the actuator arm 13, K is a disturbance that works on the apparatus, and the thickness of the band 16 is neglected. When the actuator assembly is designed so that the inequality shown above is satisfied, the magnetic head 12 can be retained stationary even if a disturbance of the above-mentioned magnitude is applied to the apparatus while the driving motor is not energized, and thereby the movement of the magnetic head 12 relative to the magnetic disk 11 while the magnetic head 12 is in contact with the magnetic disk 11, which is injurious both to the magnetic disk 11 and to the magnetic head 12, can easily be obviated.

Although the actuator arm 13 of this embodiment is illustrated as a single and unitary member, the actuator arm 13 may be a composite member consisting of members of different metals having different specific weights, to adjust the moment of the unbalanced mass thereof about the pivot 14 appropriately.

Thus, according to the present invention, the moment of the unbalanced mass of an assembly including the magnetic head about the pivot on which the assembly turns is smaller than a predetermined moment of mass; therefore, the magnetic head is held stationary even if an expected disturbance is applied to the apparatus including the assembly. Accordingly, any magnetic head locking mechanism which has been necessary for an apparatus of this kind need not be provided, the apparatus can be manufactured at a reduced cost, the magnetic head can be retained at a correct position regardless of the manner of placement of the apparatus, and the accuracy of the apparatus is improved.

What is claimed is:

1. A magnetic head actuating mechanism comprising a magnetic head and a motor for driving said magnetic head, said motor including a shaft, a capstan attached to said shaft, a pivot and an actuator arm mounting said head and supported on said pivot for turning thereon, a metallic band driven by said capstan, said metallic band being fixed to said actuator arm, characterized in that the moment of the unbalanced mass which turns about the pivot satisfies an inequality:

$$M \leq 1/K \times R_2/R_1 \times T_D$$

where M is the moment of the unbalanced mass of the assembly about the pivot, $T_D$ is the dead torque of the driving motor, K is the magnitude of a disturbance that works on the apparatus, $R_1$ is the radius of the capstan, and $R_2$ is the distance between the center of the pivot on which the actuator arm turns and the point at which said metallic band is attached to said actuator arm.

2. A magnetic head actuating mechanism according to claim 1, wherein said actuator arm is a single composite member consisting of different metals having different specific weights.

* * * * *